Figure 1:
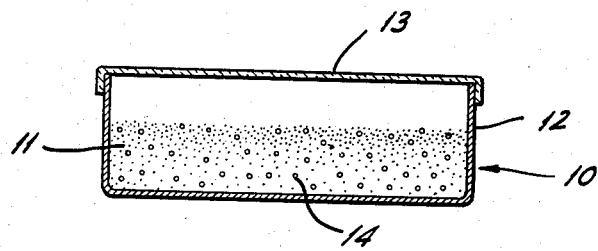

June 30, 1959   M. SADOWSKY   2,892,950
VIBRATION OR SHOCK DETECTING DEVICE
Filed Aug. 22, 1956

INVENTOR.
MEIER SADOWSKY
BY
Dean V. Hopkins
ATTORNEY

United States Patent Office 2,892,950
Patented June 30, 1959

2,892,950
VIBRATION OR SHOCK DETECTING DEVICE

Meier Sadowsky, Elkins Park, Pa., assignor to Philco Corporation, Philadelphia, Pa., a corporation of Pennsylvania Application August 22, 1956, Serial No. 605,658

3 Claims. (Cl. 250—217)

This invention relates to motion responsive devices, and more particularly to devices for detecting vibration or shock.

In many instances, it is desirable to detect and measure vibration or shock; for example, it is frequently desirable to detect and measure vibration of a machine. Due to the fact that vibration tends to be destructive of detecting devices, it is generally necessary to replace such devices frequently. Devices heretofore proposed or used for the detection of vibration have been expensive both as to original cost and as to frequent replacement cost.

Another objection has also attended the use of such prior devices. Since it is usually difficult and undesirable to mount an indicating device on a machine or other object whose vibration is to be detected and measured, it has generally been the practice to provide some physical means, mechanical or electrical, for transmitting vibrations or vibration-representative signals from the vibration detecting device to an indicating device. This has tended to render such devices more complicated and expensive, and has tended to impair their efficiency.

One object of the present invention is to provide a simple, inexpensive and efficient device for the detection of vibration or shock.

Another object of the invention is to provide such a device in which the vibration-responsive means is readily replaceable.

Another object of the invention is to provide vibration or shock responsive apparatus which does not require any physical transmitting means between an object and an indicator.

This invention is based upon the phenomenon known as "triboluminescence," i.e., luminescence produced by friction when certain confined mobile material particles are subjected to motion. For example, triboluminescent phosphor particles, when confined and subjected to motion, will emit light by virtue of pressure and/or friction to which the particles are subjected, it being believed that the light emission is due to crystal fracture. This invention is based upon the concept of utilizing the said phenomenon as a medium of detection of vibration or shock, and upon the discovery that the said phenomenon lends itself to the measurement of vibration or shock.

In accordance with the present invention, there is provided a vibration or shock detecting device which comprises enclosure means, and mobile material particles within said enclosure means emissive of light in response to motion of the device. In the preferred embodiment of the invention, there is provided a detecting device which is readily mountable on an object, such as a machine, whose vibration is to be detected, the enclosure means of said device being light-transmissive in at least one direction, and there is provided also a light-sensitive means responsive to the light emitted by said device for producing an electrical signal indicative of the vibration of said object. It has been found that the light emission of such a detecting device is directly proportional to the magnitude and frequency of vibration or shock to which the device is subjected, and therefore the amplitude of the electrical signal produced by the light-sensitive means is directly related to the magnitude and frequency of vibration or shock. Such signal may be caused to actuate an indicator or any other signal utilization means. For example, it could be utilized to actuate a relay in the event of excessive vibration to effect shutdown of a machine.

Figure 2:
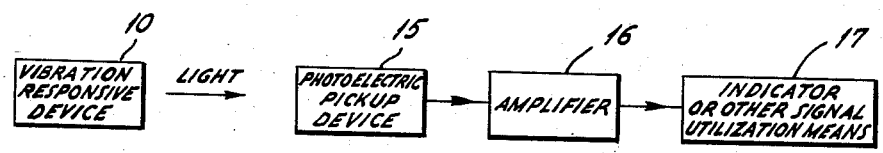
Figure 3:
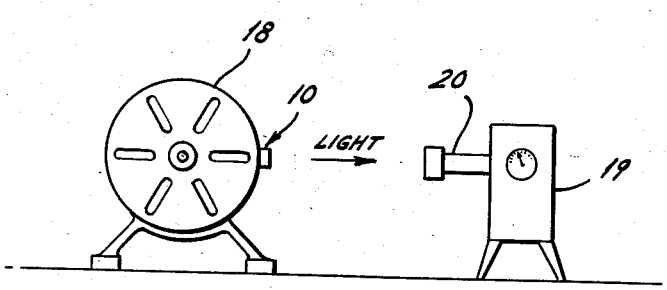

The invention may be fully understood from the following detailed description with reference to the accompanying drawing, wherein Fig. 1 is a cross-sectional view of a detecting device according to the present invention, said view being taken vertically and transversely of the device;

Fig. 2 is a block diagram of a complete system which may be provided in accordance with the invention, employing a detecting device such as that shown in Fig. 1; and Fig. 3 is an elevational view illustrating the application of the system of Fig. 2 to the detection and measurement of vibration of a machine.

Referring first to Fig. 1, there is shown a vibration or shock detecting device comprising essentially an enclosure means 10 which is transmissive of light in at least one direction, and mobile material 11 within said enclosure means emissive of light in response to motion of the device, said material having sufficient freedom of motion so as not to be inhibited in its light emissivity. The enclosure means 10 may be of any suitable form of closed container, and it may be formed of glass or other transparent material. In the present instance, it is assumed to be of circular cylindrical form, Fig. 1 being a vertical sectional view taken diametrically through the device. In the illustration, the enclosure means or container 10 is shown as comprising an open-top receptacle 12 and a cover or lid 13 firmly secured to the receptacle 12.

The material 11 may comprise triboluminescent phosphor powder. For example in experimental practice of the present invention, I have used phosphor powder sold by U.S. Radium Corporation under the commercial designation No. 779D, which is a zinc cadmium sulfide, manganese activated. This material emits visible light in the yellow portion of the spectrum and is suitable for use according to the present invention. Some other examples of triboluminescent phosphors are given on page 171 of the book "Luminescence of Solids" by H. W. Leverenz, published in 1950 by John Wiley and Sons, Inc. Any of these phosphors may be used in the practice of this invention.

The detecting device shown in Fig. 1 may be mounted in any suitable manner on an object whose vibration or shock is to be detected. In operation, the vibratory motion of the device causes subjection of the phosphor particles to pressure and/or friction, and this causes the particles to emit light. To enhance the light emissivity, small mobile elements 14 may be provided within the enclosure means 10 for the purpose of providing additional surfaces for frictional activation of the particles 11. The elements 14 may be small glass beads or balls, and they may be interspersed with the particles 11 as shown. It will be understood, of course, that the use of the elements 14 is optional, although it is a refinement feature of the present invention.

By way of example, in one experimental device a glass vial (35 mm. by 12 mm.) with a Bakelite screw cap contained a phosphor charge of 0.4 gram and twenty-five spherical glass beads 3 mm. in diameter. The vial was clamped on a vibration machine, and the machine was vibrated at 9 G from 100 to 200 cycles per second. As the vibration frequency was increased, the light output of the device increased accordingly.

A vibration detecting device of the character shown in Fig. 1 may be employed, according to the present invention, in a system or apparatus of the character illustrated by the block diagram of Fig. 2. In this system, a conventional photoelectric pick-up device 15 is arranged to receive light from the vibration responsive device 10, and the electrical signal produced by the pick-up device is amplified in a conventional amplifier 16 and is supplied to an indicator or other signal utilization means 17. The photoelectric pick-up device may, of course, contain conventional elements, such as a lens system and a selective filter, for reducing sensitivity to ambient light and for enhancing the translation of light received from device 10 into an electrical signal.

Fig. 3 illustrates the application of a system or apparatus such as shown in Fig. 2 to the detection and measurement of vibration of a machine. Thus the vibration detecting device 10 is mounted in any suitable manner upon a machine 18 whose vibration is to be detected and measured. The light receiving and translating apparatus may comprise a casing or housing 19 to house the amplifier and the indicator, and a projecting housing 20 to accommodate the photoelectric pick-up device.

As indicated, block 17 in Fig. 2 is intended to represent any signal utilization means. For example, as previously mentioned, the signal may be supplied to a relay forming part of apparatus to effect shutdown of a machine in the event of excessive vibration. Relay-controlled shutdown mechanisms are, of course, well known.

A vibration detecting device of the character provided by this invention has the advantage that the light-emissive material may be replaced at low cost if and when it depreciates due to the vibration. In fact, it could be replaced after each use of the device. Vibration is destructive of any vibration-responsive means, and in prior devices frequent replacement has been very expensive. This objection is obviated by the present invention.

This invention contemplates the utilization of any suitable arrangement employing vibration or shock detecting means operating on the principle of triboluminescence. For example, such detecting means may be embodied in a unitary assembly including means for detecting the quantity of the light emitted by the detecting means. Thus the detecting means may be provided within the housing of a photoelectric cell, or it may be embodied in a semiconductor device adapted to detect the quantity of the emitted light and to produce an output signal representing the detected light. In the case of such a combination device, comprising both the light-emissive vibration detecting means and light-sensitive means, the device may be mounted on an object whose vibration is to be detected, and the output signal of the device may be transmitted by wire to any suitable utilization means.

It is to be understood therefore that the invention is not limited to any particular embodiment, but contemplates any embodiment which may occur to those skilled in the art.

I claim:

1. Apparatus for detecting the presence and amount of vibration or shock, comprising enclosure means transmissive of light in at least one direction, mobile material within said enclosure means consisting solely of material in solid state and including triboluminescent phosphor particles emissive of light in response and in proportion to the magnitude and frequency of vibration or shock, said mobile material also including solid elements interspersed with the phosphor particles to provide additional surfaces for frictional activation of said particles, and light-sensitive means responsive to light emitted by said particles for producing an electrical signal indicative of the presence and amount of the vibration or shock.

2. Apparatus for detecting the presence and amount of vibration or shock, comprising enclosure means transmissive of light in at least one direction, mobile material within said enclosure means consisting solely of material in solid state and including triboluminescent phosphor particles emissive of light in response and in proportion to the magnitude and frequency of vibration or shock, said mobile material also including light-transmissive solid elements interspersed with the phosphor particles to provide additional surfaces for frictional activation of said particles, and light-sensitive means responsive to light emitted by said particles for producing an electrical signal indicative of the presence and amount of the vibration or shock.

3. Apparatus for detecting the presence and amount of vibration or shock, comprising means to be subjected to vibration or shock and responsive thereto to emit light in proportion to the magnitude and frequency of vibration or shock, said means comprising an enclosure transmissive of light in at least one direction and mobile material within said enclosure consisting solely of material in solid state and including triboluminescent phosphor particles which emit light solely by virtue of their physical activation in the solid state, and light-sensitive means arranged to receive unrestrictedly light emitted by said particles for producing an electrical signal indicative of the presence and amount of the vibration or shock.

References Cited in the file of this patent

UNITED STATES PATENTS

| | | |
|---|---|---|
| 2,447,863 | Kent et al. | Aug. 24, 1948 |
| 2,449,880 | Cox | Sept. 21, 1948 |
| 2,596,752 | Williams | May 13, 1952 |
| 2,816,236 | Rosen | Dec. 10, 1957 |

OTHER REFERENCES

Leverenz: "An Introduction to Luminescence of Solids," John Wiley and Sons, New York, 1950, pages 171–172.